Patented June 18, 1940

2,204,580

UNITED STATES PATENT OFFICE

2,204,580

PROCESS FOR INCREASING THE PRODUCTIVITY OF WELLS

Melvin De Groote, St. Louis, Mo., assignor, by mesne assignments, to The Dow Chemical Company, Midland, Mich., a corporation of Michigan No Drawing. Application February 17, 1936, Serial No. 64,348. Renewed August 26, 1939

9 Claims. (Cl. 166—21)

This invention relates to a novel process for increasing the productivity of deep wells, such as oil wells, gas wells, water wells and brine wells. In view of the fact that the most important industrial application of the process is concerned with oil wells, I will hereinafter describe how the process is used to increase the output of oil wells.

When an oil well is drilled into an oil-bearing stratum, the release of pressure upon the oil deposit may cause the oil to flow naturally for a certain period of time, after which the volume of flow will, in most instances, gradually decrease to a point or degree where some procedure, such as pumping, must be employed, so as to insure the production of a profitable amount of oil. Thereafter, production may continue to decline until the quantity of oil obtained from the well is so small that it is not commercially practicable to continue the well in operation. In some instances the stoppage of oil output or decline in production, above referred to, is not caused by exhaustion of the oil supply, but, on the contrary, is caused by building up of solid deposits of wax, or of inorganic salts, in the channels or pores of the oil-bearing rock. The productivity of wells of the kind above mentioned may, in some instances, be wholly, or at least partially, regenerated by mechanical means, such as the use of an explosive, but there are various objections to such mechanical treatment, such as the high cost and danger of injuring the internal well structure itself.

There are a number of methods of processes, involving the use of hydrochloric acid, that are effective for treating a clogged oil-bearing stratum consisting of a lime sand, a limestone, or a formation related to calcareous or magnesian formation, provided the clogging is due essentially to uncoated calcium carbonate or magnesium carbonate or the like. This is also true in such siliceous or similar strata, from which petroleum oil is derived, where there is a clogging of the oil sands, due to the presence of alkaline earth carbonates, and primarily calcium carbonate. It is believed that the subterranean water becomes saturated with calcium bicarbonate under pressure, and that when the well is drilled and pressure released, some of the subterranean water escapes with the oil, with the result that the solubility of the calcium carbonate or bicarbonate in the remaining subterranean water becomes reduced to such an extent or degree that precipitation takes place in the pores of the siliceous sand in the oil-bearing stratum. So far as the usual hydrochloric acid treatment is concerned, it is immaterial whether the formation itself is truly calcareous or argillaceous, or is a siliceous formation with a calcareous deposit. Naturally, magnesium carbonate deposits are susceptible to treatment as calcium carbonate deposits.

In some instances the oil-bearing strata is clogged with waxy or paraffin-like material, which is not susceptible to reaction with the acid type of reagent, and consequently, cannot be removed. In other instances the structure which is to be treated comprises calcium carbonate, magnesium carbonate, silica or kindred material which is susceptible to treatment with acid, but it may contain a coating or film of wax or asphaltic material which prevents the acid from properly contacting, and thus reacting with the material to be removed by the acid. In such instances it is sometimes possible to employ the procedure described in my U. S. Patent No. 2,050,928, dated August 11, 1936. In a number of instances, however, the coating of wax or paraffin-like material is rather superficial, and relatively slight, and it is only necessary to confer upon the hydrochloric acid solution or other acid solution, some moderate wetting effect, and it is then able to thoroughly wet the oily surface and reaction takes place.

In some instances, where the coating or film of paraffin, wax-like bodies or asphaltic material may be nothing more than a rather incoherent surface coating which the hydrochloric acid solution cannot wet, greatly improved results can be obtained if the hydrochloric acid solution employed is endowed with the property or capacity of wetting such oily surfaces. It is well known, of course, that water will not wet surfaces protected by the presence of oil, even though such oil coating is discontinuous. For example, water will not pass through an oiled sieve of rather small mesh, even though the surface is discontinuous, due to the open holes. The addition of soap to water gives it the property or capacity of passing through such oiled sieve, due to its ability to wet the same. Soap, at least of the ordinary kind, cannot be added to hydrochloric acid, because the resulting reaction decomposes the soap. Many ordinary wetting agents, such as fatty sulfonic acids, petroleum sulfonic acids and the like, cannot be added to hydrochloric acid of moderate strength, for instance, 10% of concentrated acid by volume, because the wetting agent is insoluble. Other substances, having to some degree the action of a wetting agent in water, such as glue or the like, may be added, but do not have any substantial effect upon a solution of acid, such as a hydrochloric acid, although such materials may ultimately become effective in regard to surface active properties, after the hydrochloric acid has combined with calcium carbonate, or the like, and the acidity has been greatly reduced or substantially eliminated. For the purpose herein intended, such subsequent surface activity, in neutral state, has no value.

I have found that certain wetting agents may be dissolved in hydrochloric acid, of moderate strength, without separation, so as to form a treating solution capable of displacing the oil from the oil-wetted formation and obtain wetting of the formation by the acid solution. The term "wetting agent" is commonly applied to a material which, when dissolved in a liquid, confers upon that liquid the ability to displace air from a solid surface and to spread upon that solid. The materials contemplated for use in my process, however, perform a different function from that of an ordinary wetting agent in that they allow the solution to displace oil from the oil formation, or to preferentially wet the formation solid. For this reason I prefer to call or refer to said materials as "preferential wetting agents." These preferential wetting agents include, among others sulfonated mono or poly-cyclic sulfonic acids or their nuclear substituted products, particularly alkylated nuclear substituted bi-cyclic aromatic sulfonic acids, sulfonic acid derivatives of hydroaromatic compounds, hydroxy aromatic sulfonic acids, mono-cyclic aromatic sulfonic acids where not more than three nuclear hydrogens have been substituted by alkyl radicals, polycyclic aromatic sulfonic acids where not more than two nuclear hydrogens have been substituted by alkyl groups, and especially where the substituting alkyl group does not contain more than four carbon atoms. I have found that the length of the chain of the substituting group or the number of substituting groups may be increased, in the case of a di-sulfonic acid in comparison with a mono-sulfonic acid. This is to be expected, because the addition of the second sulfonic group increases the solubility in water and in acid. A tri-sulfonic acid would be even more soluble.

As specific examples of the materials contemplated for use in my process are such materials as phenol sulfonic acid, cresol sulfonic acid, xylene sulfonic acid, cresol di-sulfonic acid, toluene di-sulfonic acid, naphthalene sulfonic acid, anthracene sulfonic acid, beta naphthol sulfonic acid, methyl naphthalene sulfonic acid, di-methyl naphthalene sulfonic acid, tri-ethyl naphthalene sulfonic acid, ethyl naphthalene sulfonic acid, di-ethyl naphthalene sulfonic acid, mono-propyl beta naphthalene sulfonic acid, mono-butyl beta naphthalene sulfonic acid, di-butyl naphthalene di-sulfonic acid, di-propyl naphthalene di-sulfonic acid, tetralin sulfonic acid, hexanol sulfonic acid, methyl hexanol sulfonic acid, cymene sulfonic acid, etc.

It is to be noted that, generally speaking, the mono-cyclic sulfonic acids are more soluble, as a rule, than the di-cyclic sulfonic acids, i. e., benzene sulfonic acid will be more soluble than the comparable naphthalene sulfonic acid. The introduction of the hydroxyl group increases the solubility in acid. The greater the number of side chains or alkyl groups introduced in the nucleus, the more the solubility in hydrochloric acid or other acid is reduced. Greater reduction of solubility in hydrochloric acid, or other acids, such as nitric acid, is generally brought about by increasing the length of the alkyl side chain. The introduction of more than the one sulfonic acid radical, as in the case of a di-sulfonic acid, increases the solubility. These reagents are more soluble, of course, in 7% hydrochloric acid, for example, than in 20% hydrochloric acid. Generally speaking, the compound which is least soluble, but still soluble enough, shows the greatest wetting effect, based on molar concentration. The amount of preferential wetting agent added will vary with the strength of the acid, the nature of the wetting agent itself, and the particular kind of acid to which it is added. In a general way, the percentages will vary from about $\frac{1}{10}$ percent to about 3% to 5%. I prefer to use toluene di-sulfonic acid, xylene sulfonic acid, or di-ethyl naphthalene sulfonic acid, or propyl naphthalene di-sulfonic acid. For convenience, these materials may be prepared in the form of a sodium salt, and used by simply adding to the mineral acid with the generation of the free sulfonic acid.

It is understood that these preferential wetting agents can be added to hydrochloric acid, which will ultimately be combined with a fluoride, so that the preferential wetting agent will eventually pass into a hydrofluoric acid solution. In other words, the effectiveness of these reagents is not limited to hydrochloric acid, but may be used in any acid in which they will remain in solution. I have not found that these sulfonic acids have any appreciable inhibitive action, and if it is desirable to use inhibitors, then any of the conventional inhibitors may be added which are not incompatible with the sulfonates or sulfonic acids of the kind herein employed.

It is also to be understood that the addition of the preferential wetting agent to hydrochloric acid, or to any other suitable acid, is not limited to any particular method of application. In other words, it may be added to hydrochloric acid, for example, if it is to be used without an inhibitor, or it may be added to hydrochloric acid with an inhibitor, or it may be added to hydrochloric acid, which is used in an emulsified form, as described in U. S. Patent No. 1,922,154, dated August 15, 1933, to Melvin De Groote. Similarly, the wetting agent may be used in connection with hydrochloric acid, which is ultimately used to generate hydrofluoric acid in situ, as described in U. S. Patent No. 1,990,969, dated February 12, 1935, to Wilson, or in the manner described in my U. S. Patent No. 2,050,927, dated August 11, 1936.

Attention is directed to the fact that material of the type herein contemplated for use in the present process may also serve an entirely distinct and different purpose as dormant demulsifiers, to cause delayed instability of otherwise fairly stable emulsions consisting of a suitable acid in an oily vehicle, as described in my U. S. Patent No. 2,050,929, dated August 11, 1936. When used as a dormant demulsifier, as described in said last mentioned patent, there may not be any desirability or necessity for a wetting effect. It is to be emphasized that in the present instance one method of using the preferential wetting agents described, is by introduction into a suitable acid, such as hydrochloric acid, with or without an inhibitor present and in a non-emulsified form. Naturally, under such circumstances, since no emulsion is present, there cannot be any action or effect similar to that described in my previously mentioned patent, which involves the action of a dormant demulsifier.

Having thus described my invention, what I claim as new and desire to secure by Letters Patent is:

1. The method of acid-treating a well in a petroleum fluid bearing formation which is coated with a wax, oil, or asphaltic film preventing the acid from attacking the formation, comprising introducing into the well an acid containing a relatively small proportion of a preferential wetting agent comprising an alkylated sulpho aromatic acid.

2. In a method of treating with aqueous hydrochloric acid a well in a petroleum fluid bearing formation which is coated with a wax, oil, or asphaltic film, preventing the acid from attacking the formation, the steps which consist in mixing with the acid a relatively small proportion of an alkylated aromatic sulfonic acid of the kind in which the alkyl radical contains not more than four carbon atoms, and additionally characterized by the fact that the total number of alkyl radicals shall not exceed two and the total number of carbon atoms in all alkyl radicals shall not exceed eight; and introducing in the well and thence in the formation, the so-formed acid solution whereby the said film is displaced, permitting the acid to attack the formation.

3. In a method of treating with aqueous hydrochloric acid a well in a petroleum fluid bearing formation which is coated with a wax, oil, or asphaltic film, preventing the acid from attacking the formation, the steps which consist in mixing with the acid a relatively small proportion of an alkylated polycyclic aromatic sulfonic acid of the kind in which the alkyl radical contains not more than four carbon atoms, and additionally characterized by the fact that the total number of alkyl radicals shall not exceed two and the total number of carbon atoms in all alkyl radicals shall not exceed eight; and introducing in the well and thence in the formation, the so-formed acid solution whereby the said film is displaced, permitting the acid to attack the formation.

4. In a method of treating with aqueous hydrochloric acid a well in a petroleum flue bearing formation which is coated with a wax, oil, or asphaltic film, preventing the acid from attacking the formation, the steps which consist in mixing with the acid a relatively small proportion of an alkylated bicyclic aromatic sulfonic acid of the kind in which the alkyl radical contains not more than four carbon atoms, and additionally characterized by the fact that the total number of alkyl radicals shall not exceed two and the total number of carbon atoms in all alkyl radicals shall not exceed eight; and introducing in the well and thence in the formation, the so-formed acid solution whereby the said film is displaced, permitting the acid to attack the formation.

5. In a method of treating with aqueous hydrochloric acid a well in a petroleum fluid bearing formation which is coated with a wax, oil, or asphaltic film, preventing the acid from attacking the formation, the steps which consist in mixing with the acid a relatively small proportion of an alkylated naphthalene sulfonic acid of the kind in which the alkyl radical contains not more than four carbon atoms, and additionally characterized by the fact that the total number of alkyl radicals shall not exceed two and the total number of carbon atoms in all alkyl radicals shall not exceed eight; and introducing in the well and thence in the formation, the so-formed acid solution whereby the said film is displaced, permitting the acid to attack the formation.

6. In a method of treating with aqueous hydrochloric acid a well in a petroleum fluid bearing formation which is coated with a wax, oil, or asphaltic film, preventing the acid from attacking the formation, the steps which consist in mixing with the acid a relatively small proportion of an ethylated naphthalene sulfonic acid containing not more than two ethyl radicals; and introducing in the well and thence in the formation, the so-formed acid solution whereby the said film is displaced, permitting the acid to attack the formation.

7. In a method of treating with aqueous hydrochloric acid a well in a petroleum fluid bearing formation which is coated with a wax, oil, or asphaltic film, preventing the acid from attacking the formation, the steps which consist in mixing with the acid a relatively small proportion of a propylated naphthalene sulfonic acid having not more than two propyl radicals; and introducing in the well and thence in the formation, the so-formed acid solution whereby the said film is displaced, permitting the acid to attack the formation.

8. In a method of treating with aqueous hydrochloric acid a well in a petroleum fluid bearing formation which is coated with a wax, oil, or asphaltic film, preventing the acid from attacking the formation, the steps which consist in mixing with the acid a relatively small proportion of a butylated naphthalene sulfonic acid having not more than two butyl radicals; and introducing in the well and thence in the formation, the so-formed acid solution whereby the said film is displaced, permitting the acid to attack the formation.

9. In a method of treating with aqueous hydrochloric acid a well in a petroleum fluid bearing formation which is coated with a wax, oil, or asphaltic film, preventing the acid from attacking the formation, the steps which consist in mixing with the acid a relatively small proportion of diethyl naphthalene sulfonic acid; and introducing in the well and thence in the formation, the so-formed acid solution whereby the said film is displaced, permitting the acid to attack the formation.

MELVIN DE GROOTE